Dec. 15, 1964 J. JUTIER 3,161,387

DETECTOR OF PASSING FOR THE RAILWAY SIGNALLING

Filed May 7, 1962

Inventor
Jean Jutier
By Stevens, Davis, Miller & Mosher
Attorneys

3,161,387
DETECTOR OF PASSING FOR THE RAILWAY SIGNALLING
Jean Jutier, Chatenay-Malabry, France, assignor to Etablissements Saxby, Paris, France, a French company
Filed May 7, 1962, Ser. No. 192,703
Claims priority, application France, May 10, 1961, 861,476
7 Claims. (Cl. 246—249)

The present invention relates to the detectors of passing meant to ensure the control of the signals or of the gates of the railway tracks with a view of meeting all the required conditions for the security in the traffic.

Said detectors of passing, often called pedals, are classified into two categories, namely the announcement pedals meant to cause the closing of the signals or gates and the disengagement or refitment pedals meant on the contrary to cause the opening of said signals or gates.

There have been manufactured disengagement pedals which are operated mechanically by the flanges of the wheels of the carriages. The pedals of this kind show the drawback of a quick wear and of a vulnerability of their components at the high speeds.

There have been manufactured magnetic pedals so designed that the vicinity of the wheel of a carriage modifies the resistance of the magnetic circuit of the pedal and induces an electromotive force in a signalling coil. The electromotive force being dependent of the rapidity of the variation of the flux, it is quite obvious that under these conditions it is very difficult to detect the wheels which are passing at a low speed.

There have been proposed so called electronic pedals either of the radioactive radiation type or of the tuned circuit type, but the latter cannot be used in full security only as announcement pedals.

An object of the invention is to provide a pedal which is based on a principle which enables it to be set as well as an announcement pedal as a disengagement pedal and which shows none of the aforesaid drawbacks of the known pedals.

According to the invention, the apparatus is constituted by an oscillator with a magnetic circuit located in the field of a second magnetic circuit with a permanent magnet, the assembly being designed and disposed in the vicinity of a rail on which the wheels of the vehicle to be detected pass in such a way that the magnetic circuit of the oscillator is saturated or not according to the location of the wheels on the rails in relation to said circuit and that the signals which are sent by the oscillator may so be induced or not in a receiving coil located in the magnetic circuit of said oscillator according as said circuit is saturated or not so that the signals which are collected by the receiving coil are an indication of the passing of said wheel.

Such a pedal is of a relatively simple structure, it enables detection of the passing of a wheel at any speed and it may be arranged as well as an announcement pedal as a disengagement pedal.

With these and other objects in view, which will become apparent in the following detailed description, the present invention will be clearly understood in connection with the accompanying drawings, in which.

Figure 1:
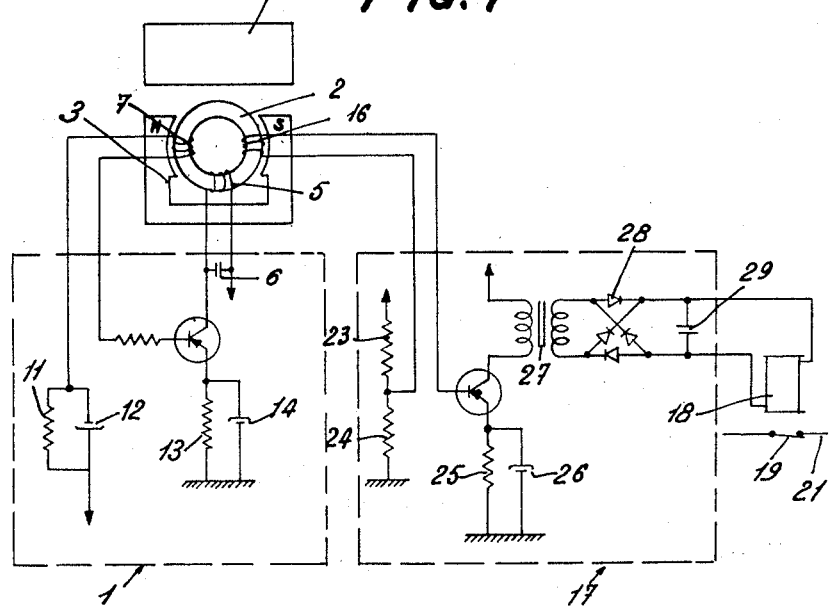
FIG. 1 shows schematically the assembly of a disengagement pedal according to the invention.

The assembly of the disengagement pedal shown schematically in FIGURE 1 includes an oscillator denoted in its entirety by 1, for instance of Hartley type, the magnetic circuit 2 of which, being formed of a material having low losses (ferrite), is disposed in the vicinity of the rail on which the wheels of the vehicles to be detected pass.

The magnetic circuit 2 of the oscillator is located in the field of a second magnetic circuit 3 constituted by permanent magnets in such a way that the magnetic field of said permanent magnets produces the saturation of the magnetic circuit 2 of the oscillator. The oscillator is of a conventional design and includes for instance an inductance 5 and a capacitance 6 which form together the tuned circuit of the oscillator, a reaction winding 7 and polarization elements 11, 12, 13, 14.

A winding 16 which is arranged on the magnetic circuit 2 of the oscillator, allows to derive a part of the energy supplied by said oscillator to energize through an amplifier which is denoted in its entirety by 17, a relay 18 the contact 19 of which is located in a signaling circuit 21.

The amplifier 17 is of any suitable conventional type including for instance transistors which are associated with polarization elements 23, 24, 25, 26, an isolating transformer 27, rectifiers 28 and a filtering capacitor 29.

There has been shown schematically as at 31, in the shape of a simple rectangle, a metallic mass belonging to a wheel passing in the vicinity of the device. At the time of said passing a part of the flux of the permanent magnet 3 is derived outwards of the magnetic circuit 2 of the oscillator, so that this circuit is no longer saturated as long as the wheel is in the vicinity thereof. After the passing of the wheel it is immediately saturated anew.

The operation of the pedal is as follows:

In the absence of any wheel in the vicinity of the pedal, the magnetic circuit 3 with permanent magnets saturates the magnetic circuit 2 of the oscillator so that the magnetic circuit 2 does not transmit any flux variation into the receiving coil 16 and that accordingly no current is admitted into relay 18 by the amplifier 17. On the contrary as soon as a wheel is in the vicinity of the pedal, the magnetic circuit 2 of the oscillator is no longer saturated so that the signals which are sent by the oscillator are now apt to cause flux variations in the magnetic circuit and accordingly give rise to an alternating current in the receiving coil 16; said current, when amplified and rectified in amplifier 17, is transmitted to relay 18 which operates the contact 19 of the signalling circuit 21.

At each passing of a wheel, the relay 18 receives thus a pulse which ensures the operation of its contact 19.

It will be noted that the assembly is so designed that any wire breaking or any short-circuit are unable to cause an energization of the relay 18 which controls the opening of the signals, which is the required condition for a maximum security.

Figure 2:
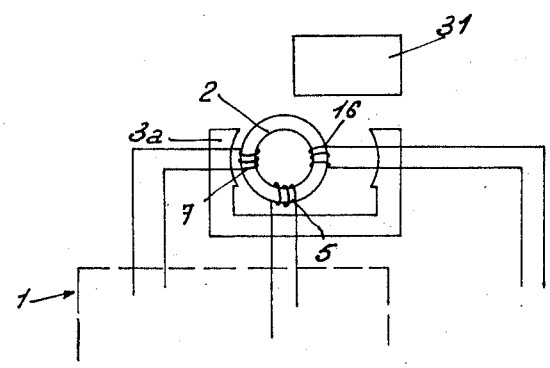
FIG. 2 shows the modification of a portion of the diagram of FIG. 1 for the carrying out of an announcement pedal.

In FIGURE 2 there is shown a modified form of the structure of the magnetic circuit of the pedal, with a view to carry out an announcement pedal. Said modified form differs from the embodiment of FIGURE 1 only in that the magnetic circuit with permanent magnets 3a, instead of being normally closed in order that the magnetic circuit 2 of the oscillator be normally saturated, is on the contrary normally open so that the magnetic circuit 2 of the oscillator is normally not saturated and that the passing of the wheel 31 reduces considerably the reluctance of said magnetic circuit in order that the flux of the circuit of the permanent magnets be closed on the magnetic circuit 2 of the oscillator at the time of the passing of the wheel and saturates it.

It is so carried out, by a trifling modification in relation to the embodiment of FIGURE 1, an announcement pedal; indeed the passing of wheel 31 saturates the magnetic circuit of the oscillator which is then blocked during said passing so that the relay 18 receives no longer any current during said passing, while normally it is energized permanently since the magnetic circuit of the oscillator is normally not saturated.

Of course, the invention is not limited to the described and shown embodiments which have been given by way of examples; it is possible to make therein numerous modifications without departing for that from the scope of the invention.

It is also well understood that the invention may receive all the applications which it is suited to.

I claim:

1. A magnetically operated railroad-signal controlling device comprising an oscillator, a reception coil connected to an output thereof, a first magnetic circuit connected to said oscillator, a second magnetic circuit, said second magnetic circuit being disposed across the field of said first magnetic circuit and in close proximity to a rail over which pass the vehicle wheels to be detected whereby the presence of a wheel on said rail modifies the induction of said second magnetic circuit and therefore the induction of said first magnetic circuit causing the output of said oscillator to vary thereby causing said reception coil to give an indication of the passage of a wheel.

2. A magnetically operated railroad-signal controlling device according to claim 1 wherein said first magnetic circuit comprises a winding mounted on a magnetic core formed of a material having low losses and said second magnetic circuit comprises a permanent magnet.

3. A magnetically operated railroad-signal controlling device according to claim 1 wherein said second magnetic circuit normally saturates the first magnetic circuit whereby a wheel passing through the magnetic field of said second magnetic circuit will shunt a portion of said field through said wheel so that said first magnetic core is no longer saturated allowing said receiving coil to receive an output from the oscillator.

4. A magnetically operated railroad-signal controlling device according to claim 1 wherein said first magnetic circuit is normally non-saturated whereby a wheel passing through the magnetic field of said second magnetic circuit will cause saturation of said first magnetic circuit interrupting the reception of the oscillator output by said receiving coil.

5. A magnetically operated railroad-signal controlling device according to claim 1 wherein said first magnetic circuit is a magnetic core in the shape of a torus.

6. A magnetically operated railroad-signal controlling device according to claim 1 wherein the oscillator is of the Hartley type.

7. A magnetically operated railroad-signal controlling device according to claim 1 wherein the receiving coil is connected to the input of an amplifier, the output of which is connected to a relay belonging to a signaling circuit.

References Cited by the Examiner

UNITED STATES PATENTS

| 2,690,536 | 9/54 | Adams | 323—89 |
| 2,875,429 | 2/59 | Quade. | |
| 2,978,614 | 4/61 | Bauman | 317—148 X |
| 2,988,689 | 6/61 | Jackson | 323—56 |

FOREIGN PATENTS

| 1,203,211 | 7/59. | France. |

LEO QUACKENBUSH, *Primary Examiner.*

JAMES S. SHANK, *Examiner.*